(12) United States Patent
Vu

(10) Patent No.: US 10,829,161 B1
(45) Date of Patent: Nov. 10, 2020

(54) VEHICLE SPLASH GUARD

(71) Applicant: NISSAN NORTH AMERICA, INC., Franklin, TN (US)

(72) Inventor: Long Vu, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 16/457,330

(22) Filed: Jun. 28, 2019

(51) Int. Cl.
*B62D 25/18* (2006.01)

(52) U.S. Cl.
CPC .................................. *B62D 25/18* (2013.01)

(58) Field of Classification Search
CPC ...... B62D 25/18; B62D 25/16; B62D 25/161; B62D 25/163; B62D 25/165; B62D 25/166; B62D 25/168; B62D 25/182; B62D 25/184; B62D 25/186; B62D 25/188
USPC .......................................................... 280/848
See application file for complete search history.

(56) References Cited

U.S. PATENT DOCUMENTS

| | | | | | |
|---|---|---|---|---|---|
| 3,782,757 | A | * | 1/1974 | Juergens | B62D 25/163 |
| | | | | | 280/851 |
| 3,954,281 | A | * | 5/1976 | Juergens | B62D 25/188 |
| | | | | | 280/851 |
| 4,007,944 | A | * | 2/1977 | Dingess | B62D 25/188 |
| | | | | | 280/851 |
| 4,605,238 | A | * | 8/1986 | Arenhold | B62D 25/18 |
| | | | | | 24/581.1 |
| 4,709,938 | A | | 12/1987 | Ward et al. | |
| 4,784,430 | A | * | 11/1988 | Biermacher | B60R 13/04 |
| | | | | | 24/289 |
| 5,120,082 | A | | 6/1992 | Ito | |
| 5,829,786 | A | * | 11/1998 | Dahl | B62D 25/18 |
| | | | | | 280/848 |
| 6,193,278 | B1 | | 2/2001 | Ward et al. | |
| 8,651,528 | B2 | * | 2/2014 | Earl | B62D 25/18 |
| | | | | | 280/851 |
| 2009/0236814 | A1 | | 9/2009 | Iverson | |
| 2013/0140804 | A1 | | 6/2013 | Ward et al. | |
| 2019/0084622 | A1 | * | 3/2019 | MacNeil | B62D 25/161 |

FOREIGN PATENT DOCUMENTS

| | | |
|---|---|---|
| DE | 3532985 A1 | 3/1987 |
| DE | 4415648 C1 | 7/1995 |
| GB | 807479 A | 1/1959 |
| GB | 2223723 A | 4/1990 |
| JP | H03-276879 A | 12/1991 |

\* cited by examiner

*Primary Examiner* — John D Walters
(74) *Attorney, Agent, or Firm* — Global IP Counselors, LLP

(57) ABSTRACT

A vehicle splash guard includes a flexible body and at least one reinforcement member. The flexible body has a body panel attachment area that is configured to abut a vehicle body panel. The reinforcement member is fixedly connected to the flexible body. The reinforcement member has at least one bending portion. The bending portion is a portion of weakness in the reinforcement member to enable the reinforcement member to deform at the bending portion in a direction towards the vehicle body panel to reduce a space between the splash guard and the vehicle body panel when the splash guard is installed onto the vehicle body panel.

20 Claims, 8 Drawing Sheets

VEHICLE SPLASH GUARD

BACKGROUND

Field of the Invention

The present invention generally relates to a vehicle splash guard. More specifically, the present invention relates to a vehicle splash guard having at least one reinforcement member.

Background Information

Vehicle tires can propel a large amount of debris during travel, such as mud, dirt and other wastes. The expelling of debris can cause damage to the vehicle exterior and also can be propelled towards external objects, such as pedestrians and other vehicles. Therefore, vehicles are typically equipped with splash guards that are fixedly attached to the vehicle body panel at a location adjacent to the wheel well. Splash guards are typically made of a flexible material, such as rubber. Splash guards can be large or rectangular or L-shaped sheets suspended behind the tires, or may be small molded lips below the rear of the vehicle's wheel wells. Splash guards are also referred to as mud flaps. Splash guards can be aerodynamically engineered, utilizing shaping, louvers or vents to improve airflow and lower drag.

SUMMARY

In view of the state of the known technology, one aspect of the present disclosure is to provide a vehicle splash guard comprising a flexible body and at least one reinforcement member. The flexible body has a body panel attachment area that is configured to abut a vehicle body panel. The reinforcement member is fixedly connected to the flexible body. The reinforcement member has at least one bending portion. The bending portion is a portion of weakness in the reinforcement member to enable the reinforcement member to deform at the bending portion in a direction towards the vehicle body panel to reduce a space between the splash guard and the vehicle body panel when the splash guard is installed onto the vehicle body panel.

In view of the state of the known technology, one aspect of the present disclosure is to provide a vehicle comprising a vehicle body panel and a splash guard. The vehicle body panel has a quarter panel. The splash guard is fixedly attached to the quarter panel. The splash guard has a flexible body and at least one reinforcement member embedded into the flexible body. The at least one reinforcement member has a bending portion that is a portion of weakness of the at least one reinforcement member to enable the flexible body to bend towards the quarter panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
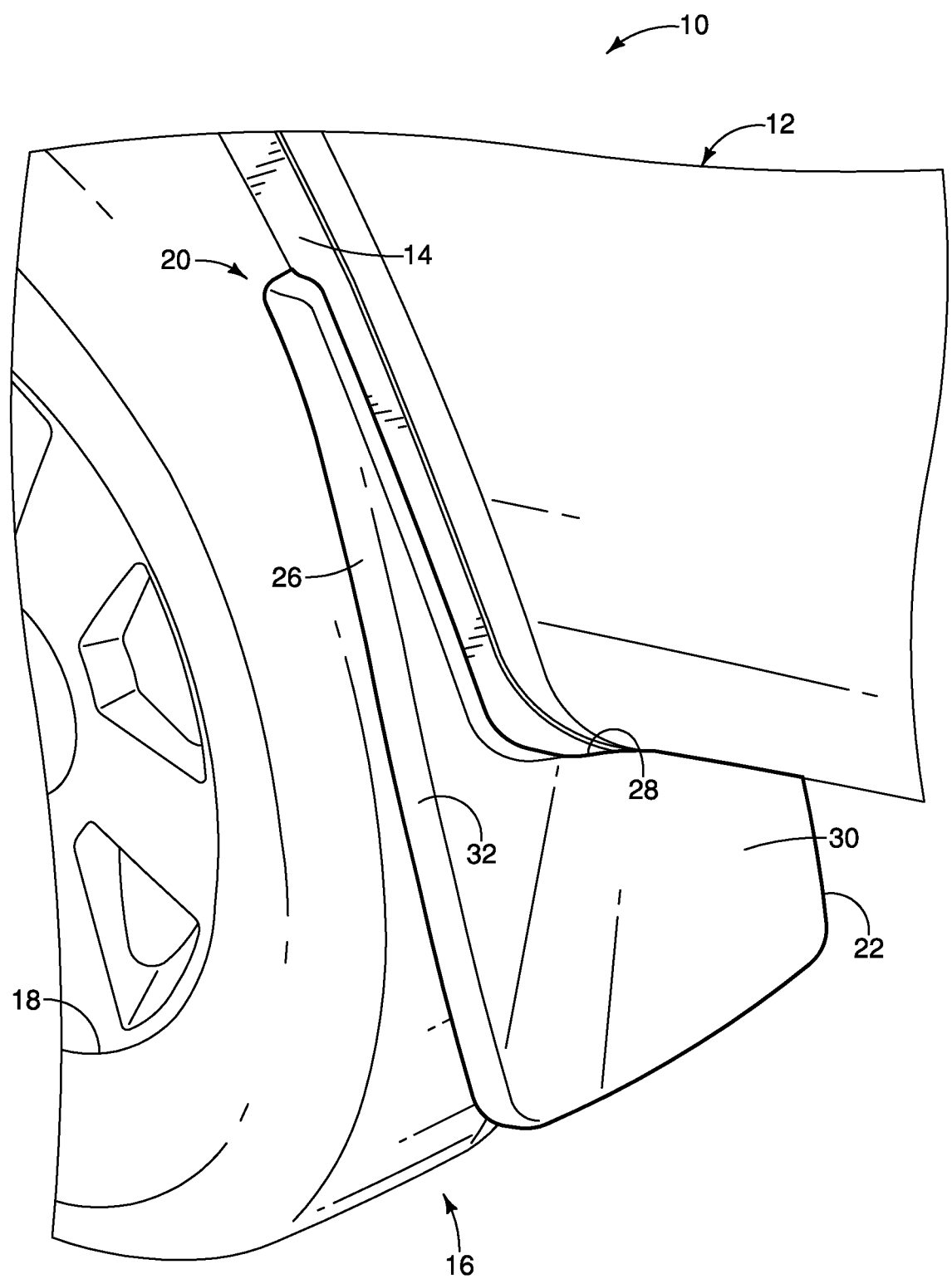
FIG. 1 is a perspective view of a portion of a vehicle equipped with a vehicle splash guard that is positioned near the vehicle wheel well.

Referring initially to FIG. 1, a portion of a vehicle 10 is illustrated having a vehicle body panel 12. In particular, the vehicle body panel 12 illustrated includes a quarter panel 14 of the vehicle 10. However, it will be apparent to those skilled in the vehicle field from this disclosure that the body panel 12 can include a front fender of the vehicle 10 and as well as including the quarter panel 14. Therefore, the quarter panel 14 is the part of the body panel 12 that defines a vehicle exterior surface extending between a rear door and a rear storage area of the vehicle 10. The quarter panel 14 typically wraps around a wheel well 16 (e.g., an underside of the fender) of the vehicle 10 that houses the vehicle's tires 18. The quarter panel 14 is conventional and can be made of sheet metal, fiberglass, carbon fiber, or fiber-reinforced plastic. The body panel 12 can alternatively include a trim piece for the vehicle 10 that is fitted over the wheel well 16. The trim piece is often installed to the body panel 12 along the perimeter of the wheel well 16 above the tire 18. When the vehicle 10 is running, debris such as sand, mud, rocks, liquids, etc. may be sprayed by the rotating tire(s) 18. For example, during forward driving, the top of the tire 18 rotates upward and forward, and can propel objects into the air at other vehicles or pedestrians. Therefore, the vehicle 10 is equipped with a splash guard 20 to deflect debris. As shown, the splash guard 20 of the illustrated embodiment is fixedly attached to the quarter panel 14 of the vehicle 10. Although FIG. 1 illustrates the splash guard 20 as being a rear splash guard that is attached behind a rear tire 18, it will be apparent to those skilled in the vehicle field from this disclosure that the splash guard 20 can be alternatively implemented as a front splash guard that is installed behind a front tire. Therefore, the splash guard 20 can alternatively be attached to the front fender.

The splash guard 20 (alternatively called a mud flap) is used in combination with the quarter panel 14 to protect the vehicle 10, passengers, other vehicles, and pedestrians from mud and other flying debris thrown into the air by rotating tire 18(s) of the vehicle 10. A splash guard 20 is typically made from a flexible material such as rubber that is not easily damaged by contact with flying debris, the tire 18, or the road surface. The splash guard 20 is typically made from sturdy and flexible material such as vulcanized rubber, including polypropylene (PP)/ethylene-propylene-diene (EPDM) or thermoplastic olefin (TPO).

During assembly of the vehicle 10 at a vehicle assembly plant, a gap between the quarter panel 14 and splash guard 20 can occur. Vehicle build variations can also cause a gap between splash guards and a vehicle quarter panel. Conventionally, ramps and stand-offs are utilized as countermeasures to reduce the gap between the splash guard and the quarter panel. However, these conventional countermeasure become less effective due to the flexibility of typical splash guard material. Alternatively, foam inserts have been utilized but requires hand assembly to the quarter panel which is costly. Further, making the splash guard from stiffer materials will chafe the paint from the quarter panel.

Therefore, in the illustrated embodiment, the vehicle splash guard 20 comprises a flexible body 22 and at least one reinforcement member 24 to enable the flexible body 22 to bend towards the quarter panel 14 under a predetermined force. In this way, the gap between the splash guard 20 and the quarter panel 14 can be reduced or eliminated. In the illustrated embodiment, the splash guard 20 is provided with a first reinforcement member 24A, a second reinforcement member 24B and a third reinforcement member 24C. Therefore, the at least one reinforcement member 24 includes the first reinforcement member 24A, the second reinforcement member 24B and the third reinforcement member 24C. However, it will be apparent to those skilled in the vehicle field from this disclosure that the splash guard 20 can be provided with only a single one of the reinforcement members 24. As will be further described below, the reinforcement members 24A, 24B and 24C are embedded into the vehicle splash guard 20.

Figure 2:
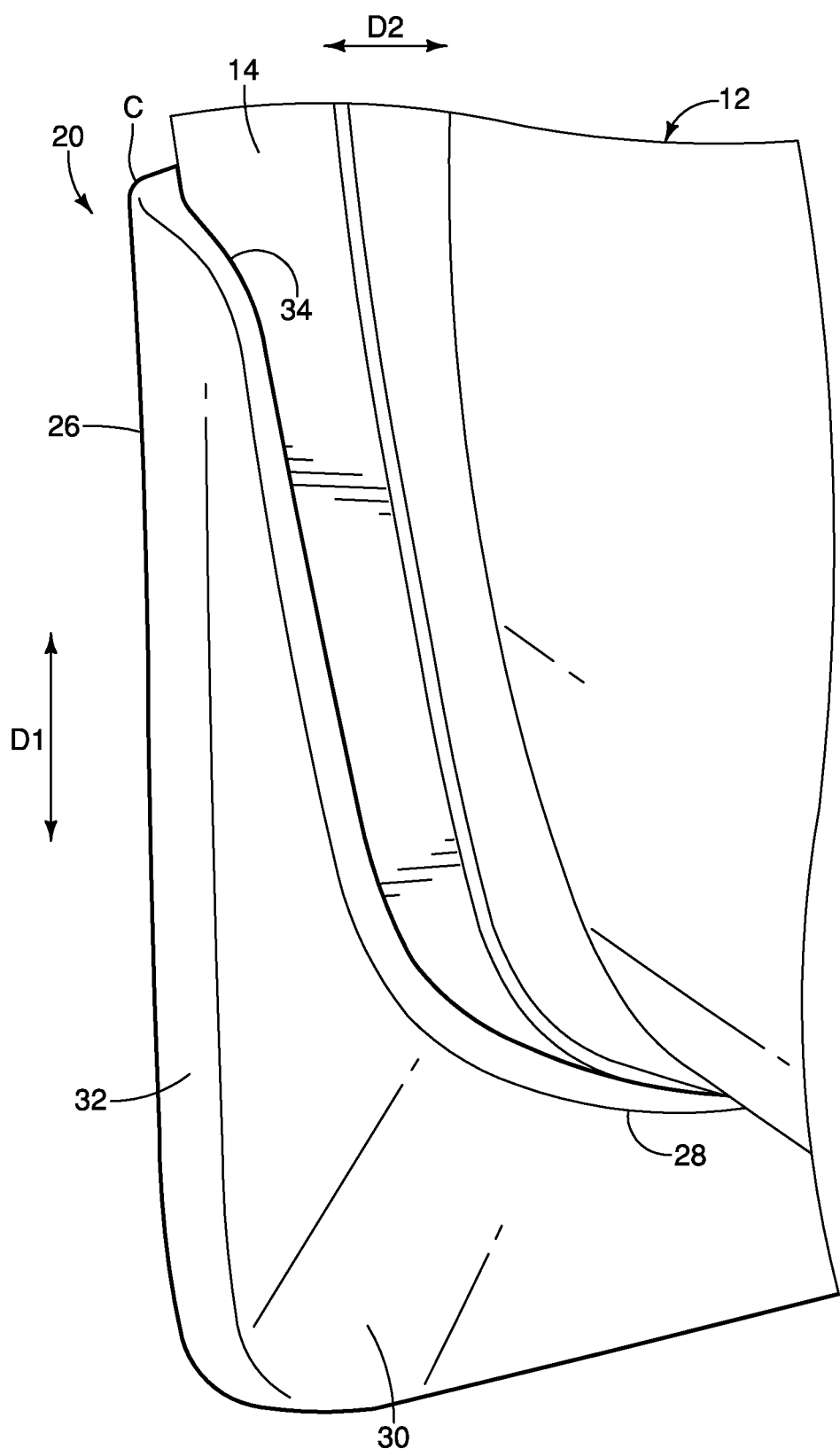
FIG. 2 is perspective view of a rear-facing side of the splash guard attached to a quarter panel of the vehicle.
Figure 3:
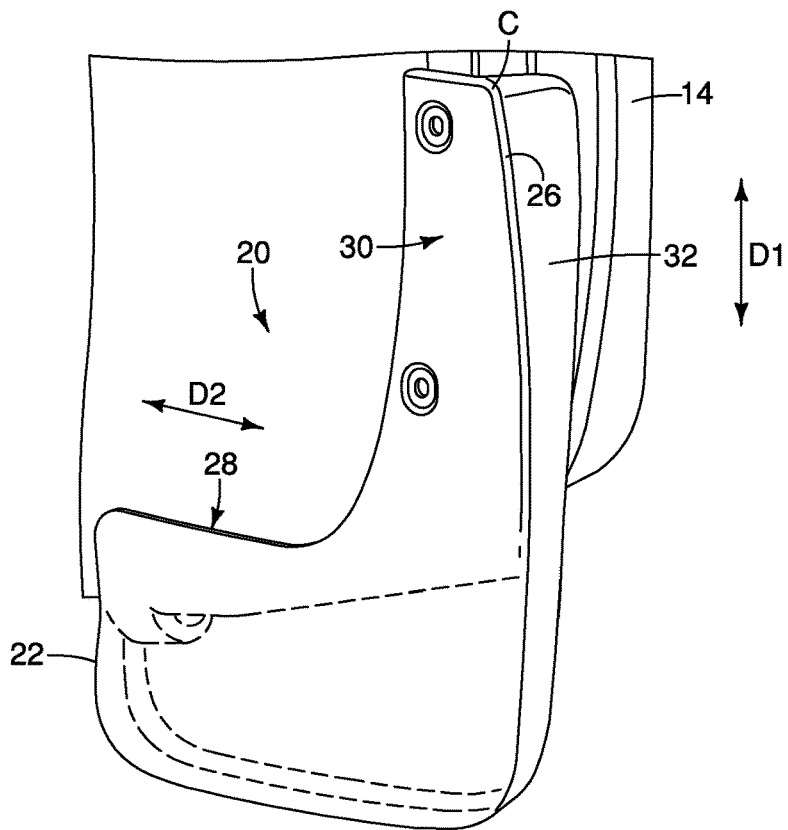
FIG. 3 is a perspective view of a wheel-facing side of the splash guard.
Figure 4:
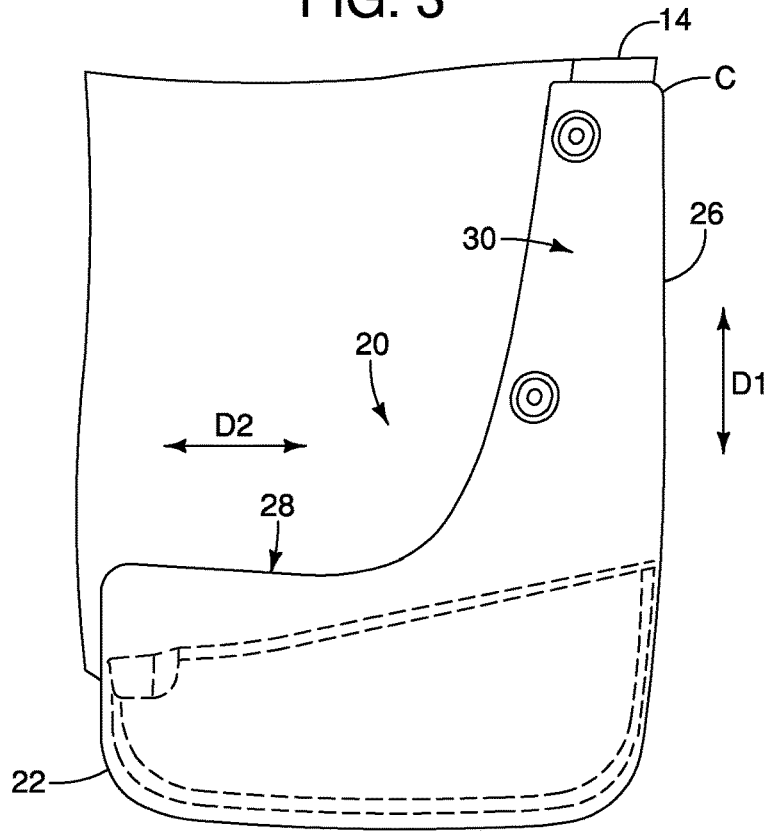
FIG. 4 is a plan view of the wheel-facing side of the splash guard.
Figure 5:
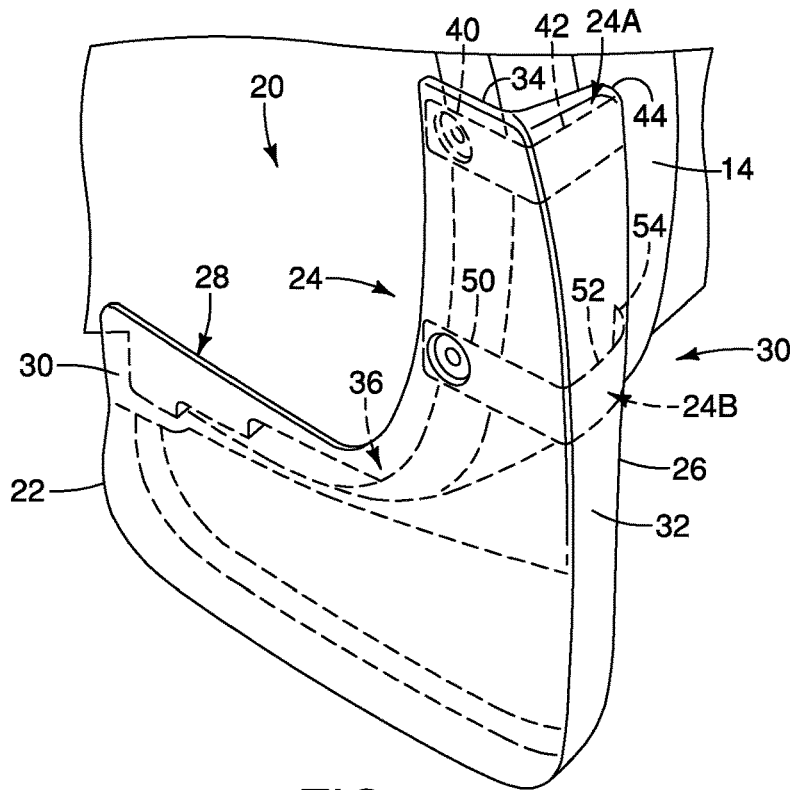
FIG. 5 is a top perspective view of the wheel-facing side of the splash guard equipped with a reinforcement member.
Figure 6:
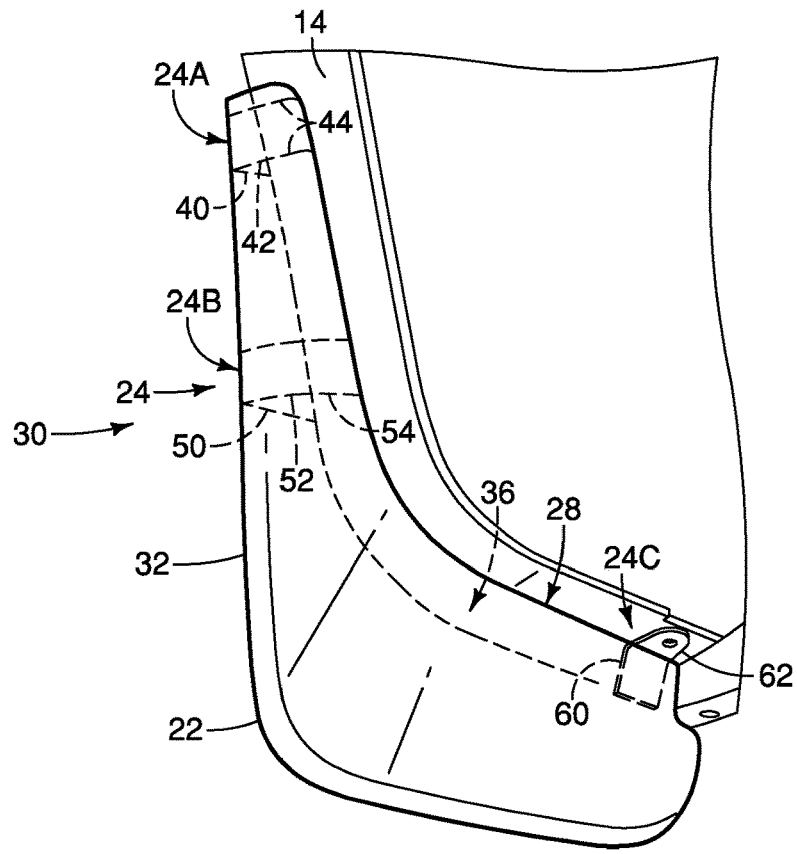
FIG. 6 is a perspective view of a vehicle rear-facing side of the splash guard.

Referring to FIGS. 2 to 4, the flexible body 22 of the splash guard 20 includes an elongated area 26 and a lateral area 28 that extends at an angle with respect to the elongated area 26. The elongated area 26 extends in a vehicle height direction D1. The lateral area 28 extends in a vehicle width direction D2. The flexible body 22 includes a wheel-facing wall 30 that faces the wheel well 16, as best seen in FIG. 1. As shown in FIGS. 1, 3 and 5, the flexible body 22 further includes an outer sidewall 34 that extends from the wheel-facing wall 30 in a direction towards the vehicle body panel 12. That is, the outer sidewall 34 extends from the wheel-facing wall 30 towards the quarter panel 14. As seen in FIGS. 5 and 6, the flexible body 22 further includes an inner sidewall 34 disposed opposite of the wheel-facing wall 30 with respect to the outer sidewall 34.

The flexible body 22 has a body panel attachment area 36 that is configured to abut the vehicle body panel 12 (e.g., the quarter panel 14). That is, the splash guard 20 is attached to the quarter panel 14 at the body panel attachment area 36. The body panel attachment area 36 is disposed opposite of the wheel-facing wall 30 on the flexible body 22. The body panel attachment area 36 includes part of the elongated area 26 and part of the lateral area 28. In particular, the body panel attachment area 36 is defined by the inner sidewall 34. While the flexible body 22 of the illustrated embodiment is shown as being an L-shaped flexible body 22 having the elongated area 26 and the lateral area 28 extending at an angle with respect to each other, it will be apparent to those skilled in the vehicle field from this disclosure that the reinforcement members 24A, 24B and 24C can be implemented with a splash guard 20 having different shapes.

In the illustrated embodiment, the first, second and third reinforcement members 24A, 24B and 24C are each a metal insert that are fixedly connected to the flexible body 22. Specifically, the first, second and third reinforcement members 24A, 24B and 24C are pieces of stamped metal that are over-molded to an interior of the flexible body 22. Therefore, the reinforcement members are preferably completely covered with a non-conductive material (e.g., plastic) to minimize corrosion of the reinforcement members. Alternatively speaking, the first, second and third reinforcement members 24A, 24B and 24C are integrally fixed to the flexible body 22 or embedded into the flexible body 22.

In the illustrated embodiment, each of the first, second and third reinforcement members 24A, 24B and 24C has a bending portion 38 that is a portion of weakness of the reinforcement member to enable the flexible body 22 to bend towards the quarter panel 14. That is, in the illustrated embodiment, each of the reinforcement members 24A, 24B and 24C includes at least one bending portion 38. The first, second and third reinforcement members 24A, 24B and 24C are positioned and configured to plastically deform at the bending portion 38 when enough force is applied to ensure the gap between the quarter panel 14 and the splash guard 20 is minimal.

Figure 7:
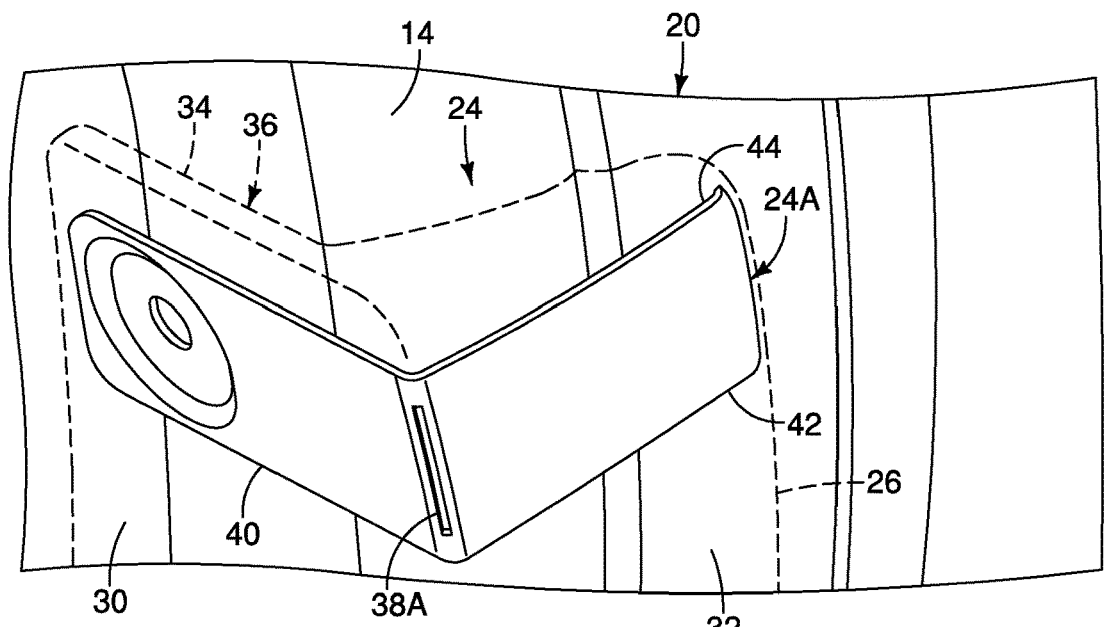
FIG. 7 is an enlarged view of a portion of the splash guard showing the first reinforcement member.
Figure 8:
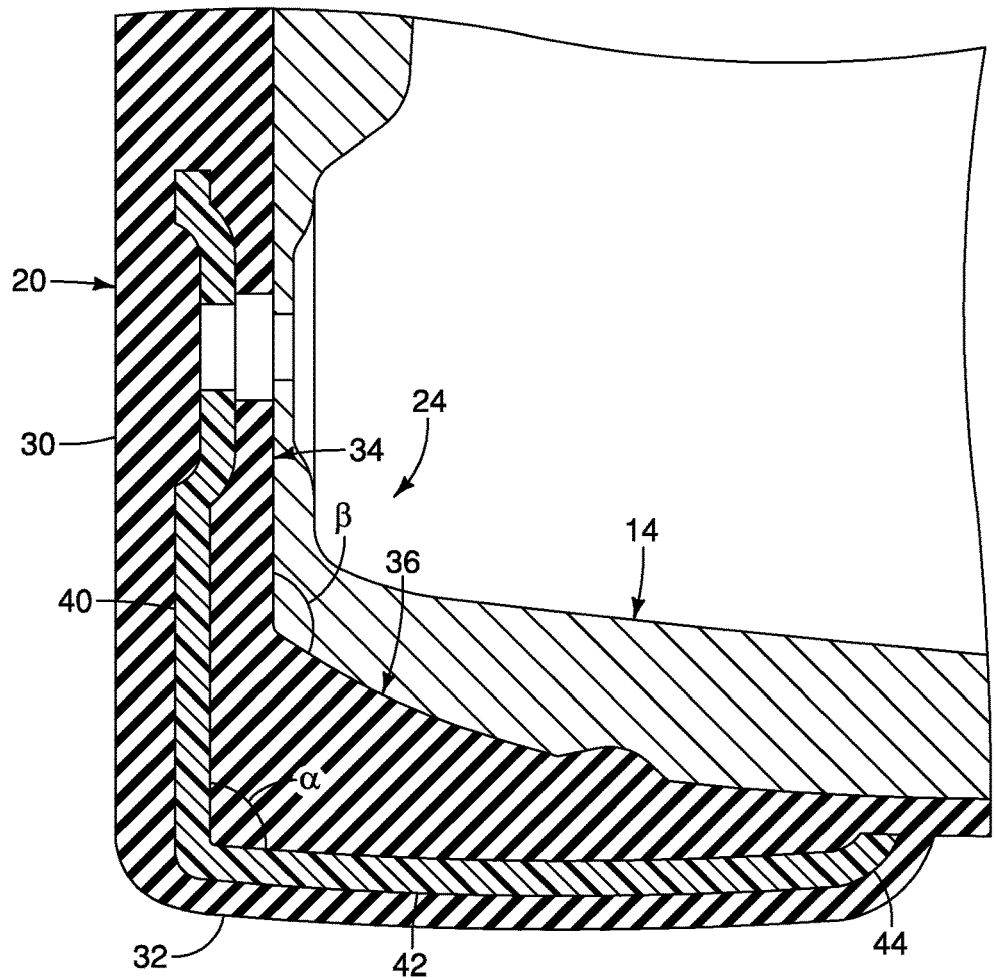
FIG. 8 is a cross-sectional view of the first reinforcement member taken along lines 8-8 of FIG. 7.
Figure 12:
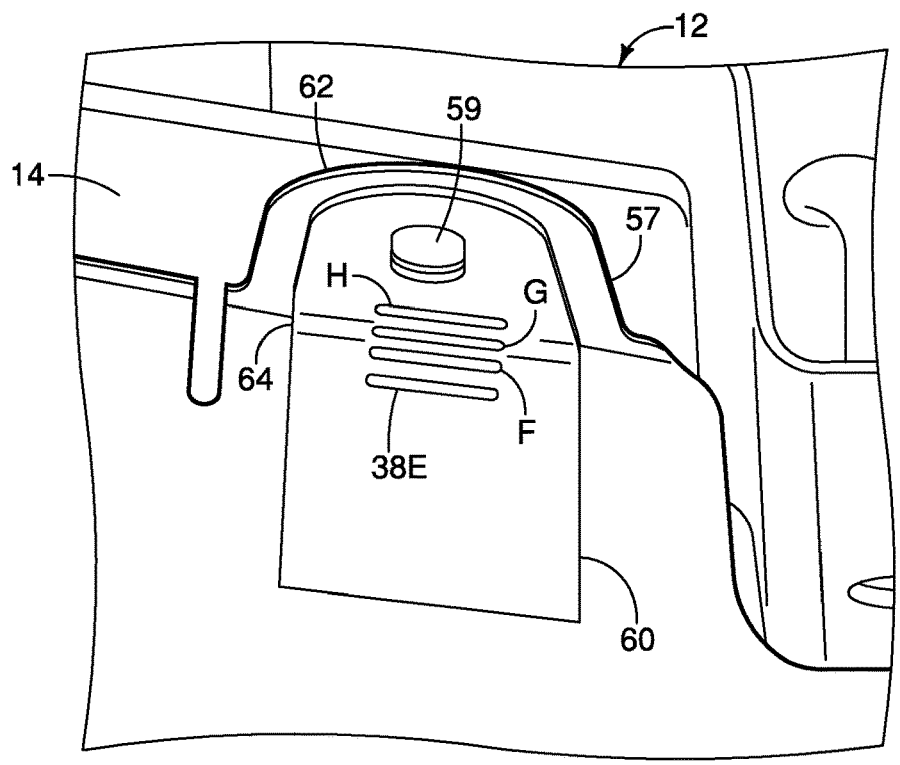
FIG. 12 is an enlarged view of the a portion of the splash guard showing the third reinforcement member.

Referring to FIGS. 5, 7 and 8, the first reinforcement member 24A is disposed in the elongated area 26. The second reinforcement member 24B is disposed in the elongated area 26 and at location below the first reinforcement member 24A. As seen in FIG. 12, the third reinforcement member 24C is disposed in the lateral area 28 below and laterally offset from the first and second reinforcement members 24A and 24B. In the illustrated embodiment, the first and second reinforcement members 24A and 24B are positioned on the flexible body 22 to prevent or minimize the formation of a gap between the elongated area 26 of the splash guard 20 and the quarter panel 14. The third reinforcement member 24C is positioned on the flexible body 22 to prevent or minimize the formation of a gap between the lateral area 28 of the splash guard 20 and the quarter panel 14. Therefore, the third reinforcement member 24C is positioned below the first and second reinforcement members 24A and 24B when the splash guard 20 is installed to the vehicle body panel 12.

As seen in FIGS. 7 and 8, the first reinforcement member 24A has a bending portion 38A that is a portion of weakness in the first reinforcement member 24A. The bending portion 38A enables the first reinforcement member 24A to deform at the bending portion 38A in a direction towards the quarter panel 14. In the illustrated embodiment, the bending portion 38A is a perforated slit or a relief cut in the first reinforcement member 24A. Therefore, the bending portion 38A is preferably laser cut in to the bent edges of the first reinforcement member 24A prior to forming the shape of the first reinforcement member 24A. As shown, the bending portion 38A is an elongated relief cut formed in the stamped metal of the first reinforcement member 24A. It will be apparent to those skilled in the vehicle field from this disclosure that the relief cut of the bending portion 38A can be any geometry depending on the size and shape of the splash guard 20 and the vehicle body panel 12. It will also be apparent to those skilled in the vehicle field from this disclosure that the relief cut of the bending portion 38A can be any geometry depending on the thickness of the stamped metal of the first reinforcement member 24A.

As best seen in FIGS. 7 and 8, the first reinforcement member 24A includes a first support portion 40 and a second support portion 42 connected by the bending portion 34A.

The first and second support portions 40 and 42 are angled with respect to each other by a predetermined angle α. The first and second support portions 40 and 42 are formed as a one-piece member. The first support portion 40 extends along the wheel-facing wall 30 of the flexible body 22. The second support portion 42 is aligned with the outer sidewall 34. The bending portion 34A substantially aligns with an edge of the splash guard 20 formed by the outer sidewall 34 and the wheel-facing wall 30. The first support portion 40 of the first reinforcement member 24A includes an embossed area that has a mounting opening for receiving a fastener (not shown) that fastens the splash guard 20 to the quarter panel 14. The second support portion 42 of the first reinforcement member 24A has a curved end section 44 that is at the end that is opposite the bending portion 38A. The curved end section 44 curves towards the vehicle body panel 12 in a state where the splash guard 20 is mounted to the vehicle body panel 12.

Bending of the bending portion 38A reduces the space between the splash guard 20 and the vehicle body panel 12 when the splash guard 20 is installed onto the quarter panel 14. Because, the bending portion 38A defines an area of reduced strength relative to the first and second support portions 40 and 42, the splash guard 20 will bend towards the quarter panel 14 at the bending portion 38A. The bending portion 38A defines a fold line or a line of weakness in a corner C of the first reinforcement member 24A that aligns with a corner C of the flexible body 22. Therefore, bending at the bending portion 38A can cause the corner C of the flexible body 22 to pinch against the quarter panel 14 to deform the splash guard 20 in a manner to conform to the shape of the quarter panel 14.

The bending portion 38A is defined by the predetermined angle α between the first and second support portions 40 and 42. In the illustrated embodiment, the predetermined angle α depends on a corresponding predetermined angle β of the splash guard 20, such as an angle β between the wheel-facing wall 30 and the outer sidewall 34, as best seen in FIG. 8. In other words, the predetermined angle α can increase or decrease depending on the corresponding predetermined angle β. Further, it will be apparent to those skilled in the vehicle field from this disclosure that the predetermined angle α and β can vary depending on the build of the vehicle and/or the quarter panel 14.

In the illustrated embodiment, the bending portion 38A of the first reinforcement member 24A extends along the fold line between the first and second support portions 40 and 42 at the predetermined angle α. As a gap is more likely to be created between the splash guard 20 and the quarter panel 14 at the corner C between the wheel-facing wall 30 and the outer sidewall 34, the first and second support portions 40 and 42 are angled with respect to each other at the corner C to bend at the predetermined angle α and decrease the gap at this location. In this way, the first reinforcement member 24A plastically deforms at the bending portion 38A to maintain the splash guard 20 in a state that abuts the vehicle body panel 12. Preferably, the predetermined angle α can be adjusted by an installer (not shown) by pushing or pulling the first and second support portions 40 and 42 to apply a bending force to bending portion 38A. As a result, the bending of the first reinforcement member 24A is concentrated along the fold line of the bending portion 38A when the first reinforcement member 24A is bent to adjust the predetermined angle α.

Figure 9:
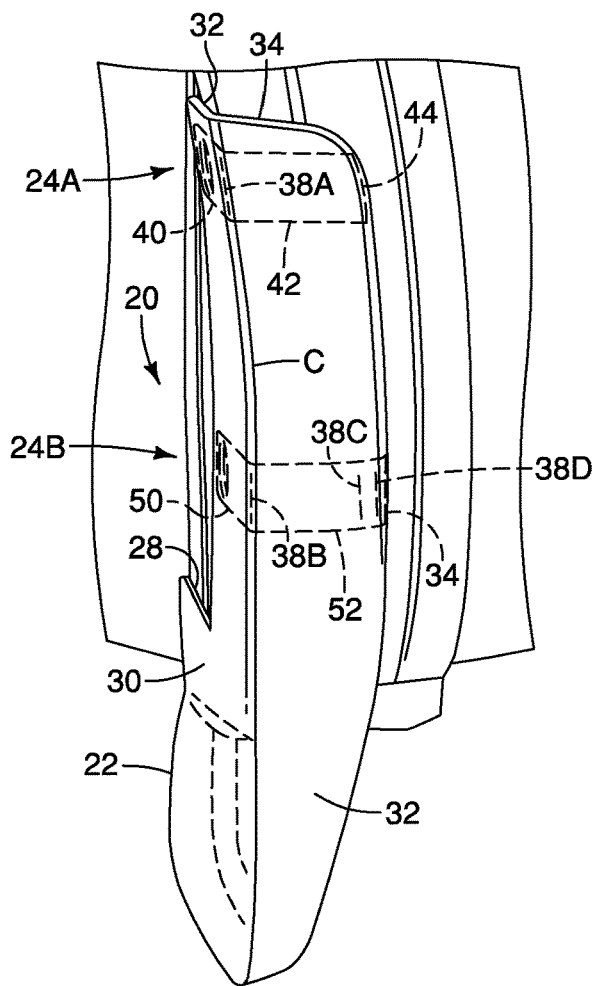
FIG. 9 is a side view of the splash guard showing the first and second reinforcement members.
Figure 10:
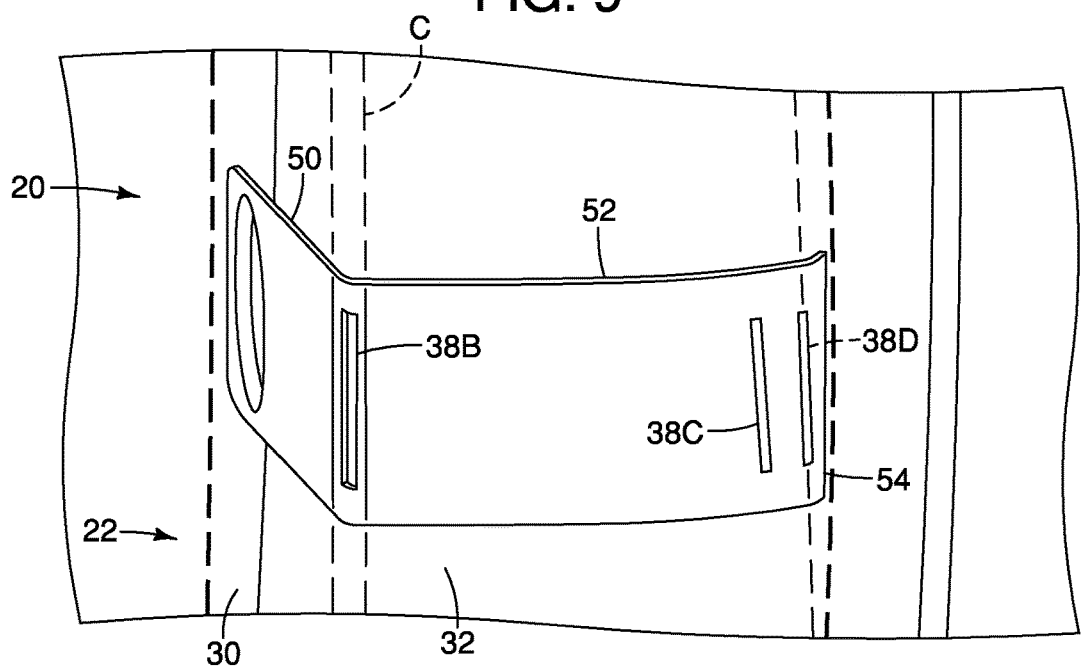
FIG. 10 is an enlarged view of a portion the splash guard showing the second reinforcement member.
Figure 11:
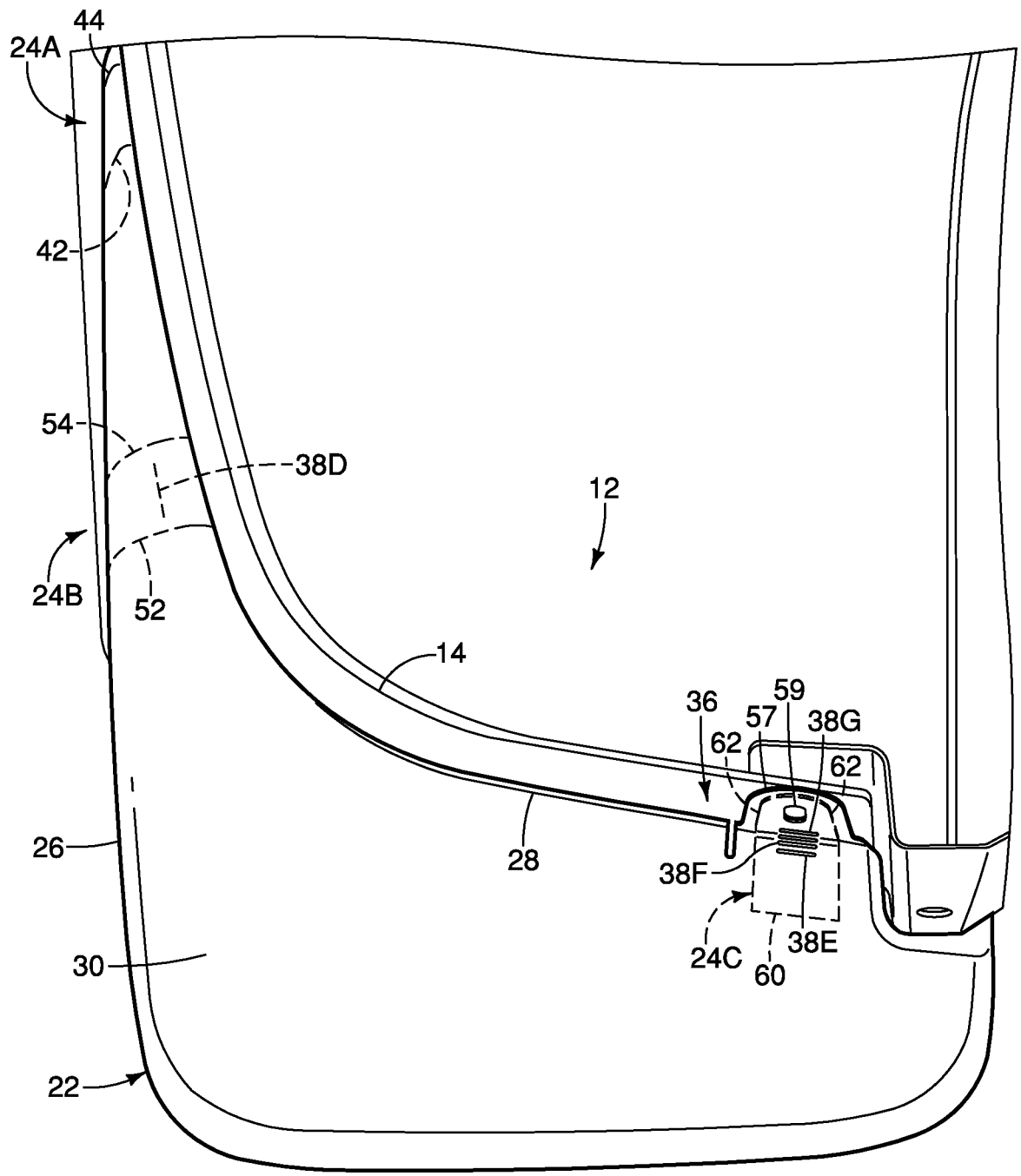
FIG. 11 is a bottom perspective view of the rear-facing side of the splash guard showing the third reinforcement member.

Referring to FIGS. 9 and 10, the second reinforcement member 24B is positioned below the first reinforcement member 24A in a state in which the splash guard 20 is installed onto the quarter panel 14. The second reinforcement member 24B is over-molded to the flexible body 22 in a manner similar to the first reinforcement member 24A. The second reinforcement member 24B also includes a first support portion 50 and a second support portion 52 that are angled with respect to each other at a bending portion 38B defined by another predetermined angle. In the illustrated embodiment, the second reinforcement member 24B is similar to the first reinforcement member 24A, with the another predetermined angle being substantially identical to the predetermined angle α of the first reinforcement member 24A. In particular, the another predetermined angle of the bending portion 38B of the second reinforcement member 24B also aligns with the corner C between the wheel-facing wall 30 and the outer sidewall 34. As best seen in FIG. 10, the second reinforcement member 24B includes a curved end section 54 that is at the end that is opposite the bending portion 38B that extends towards the vehicle body panel 12.

The second reinforcement member 24B includes a second bending portion 38C at the curved end section 54. In particular, the second reinforcement member 24B includes the second bending portion 38C that is formed on the second support portion 52. In the illustrated embodiment as shown, the second reinforcement member further includes a third bending portion 38D at the curved end section 54 adjacent to the second bending portion 38C. The second and third bending portions 38C and 38D are also perforated slits that enable the splash guard 20 to bend towards the quarter panel 14 at the second and third bending portions 38C and 38D. The second reinforcement member 24B is made of a similar material as the first reinforcement member 24A and is over-molded to the flexible body 22 in a similar manner as the first reinforcement member 24A. The second reinforcement member 24B preferably also plastically deforms at the bending portions 38B, 38C and 38D under a prescribed force. Due to the similarity between the first and second reinforcement members 24A and 24B, the second reinforcement member 24B will not be further discussed for brevity.

Referring to FIGS. 11 to 14, the third reinforcement member 24C is disposed at the body panel attachment area 36 in the lateral area 28 of the flexible body 22. In particular, the third reinforcement member 24C is embedded into the flexible body 22 at a fastening location of the splash guard 20 where the flexible body 22 is fastened to the quarter panel 14. The flexible body 22 includes a fastening flange 57 that is part of the body panel attachment area 36. That is, the fastening flange 57 abuts the body panel 12 (the quarter panel 14) with the splash guard 20 is installed onto the quarter panel 14. The fastening flange 57 has a through hole 58 for receiving a fastener (not shown) that fastens the flexible body 22 to the quarter panel 14. Therefore, the third reinforcement member 24C preferably includes another through hole 59 corresponding to the through hole 58 of the flange 57 to receive the fastener therethrough.

Figure 13:
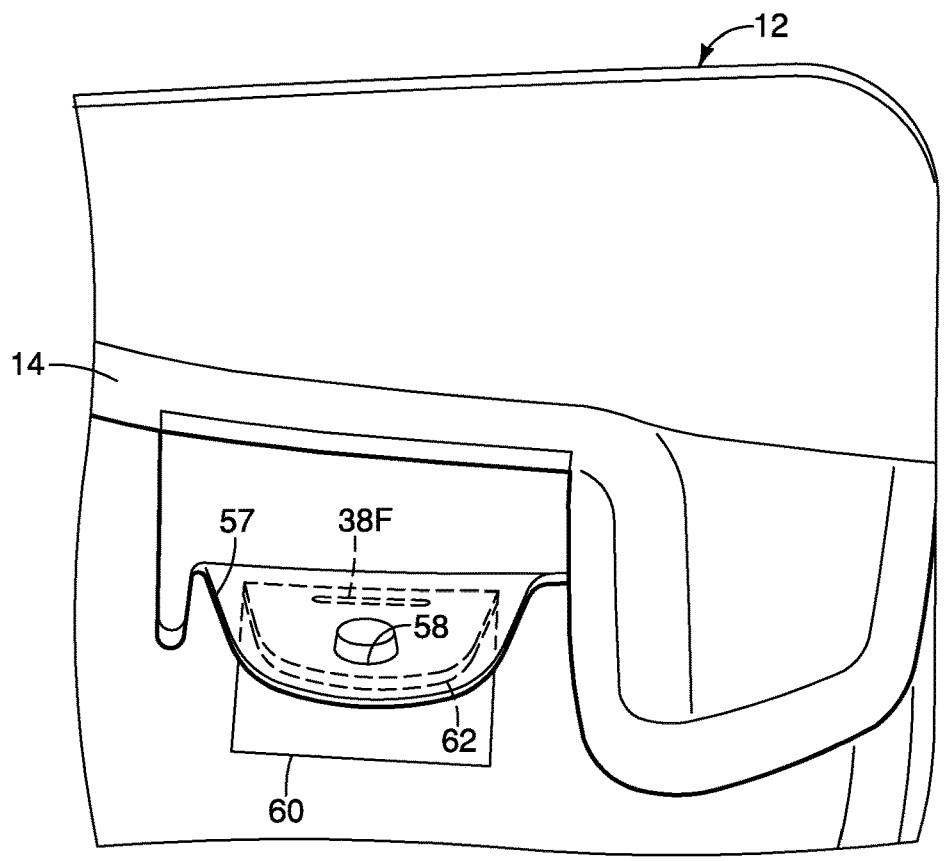
FIG. 13 is another enlarged view of a portion of the splash guard showing the third reinforcement member.

The third reinforcement member 24C has a first support portion 60 and a second support portion 62 that are angled with respect to each other by a predetermined angle, similar to that of the first and second reinforcement members 24A and 24B. The first support portion 60 extends along the wheel-facing wall 30 and the second support portion 62 has the through hole and extends along the fastening flange 57. As best seen in FIGS. 12 and 13, the second support portion 62 extends curved from the first support portion 60. Therefore, the first and second support portions 60 and 62 are connected to each other by a curved corner 64. The third reinforcement member 24C includes at least one bending portion 38E at the curved corner 64 between the first and second support portions 60 and 62. The bending portion 38E of the third reinforcement member 24C extends along the body panel attachment area 36. In the illustrated embodiment, the third reinforcement member 24C includes four bending portions 38E, 38F, 38G and 38H at the curved corner 64 to bend the flexible body 22 towards the quarter panel 14. The bending portions of the third reinforcement member 24C are relief cuts that are basically perforated slits, similar to the bending portions 38A, 38B, 38C and 38D of the first and second reinforcement members 24A and 24B. The third reinforcement member 24C preferably also plastically deforms at the bending portions 38E, 38F, 38G and 38H under a prescribed force.

In the illustrated embodiment, while the splash guard 20 is illustrated as including the first, second and third reinforcement members 24A, 24B and 24C, it will be apparent to those skilled in the vehicle field from this disclosure that the splash guard 20 can include only a single reinforcement member 24 or additional reinforcement members 24 as needed and/or desired. Further, it will be apparent to those skilled in the vehicle field from this disclosure that the splash guard 20 can include reinforcement members 24 at varying locations to prevent the formation of a gap from the quarter panel 14 at those locations. In addition, while the first, second and third reinforcement members 24A, 24B and 24C are illustrated as including different numbers of bending portions 38 (e.g., the first reinforcement member 24A is illustrated as including a single bending portion 38A while the third reinforcement member 24C is illustrated as including three bending portions 38E, 38F and 38G), it will be apparent to those skilled in the vehicle field from this disclosure that each of the first, second and third reinforcement members 24A, 24B and 24C can include additional or fewer bending portions 38 or can alternatively be made without the bending portions 38 as needed and/or desired.

GENERAL INTERPRETATION OF TERMS

In understanding the scope of the present invention, the term "comprising" and its derivatives, as used herein, are intended to be open ended terms that specify the presence of the stated features, elements, components and/or groups, but do not exclude the presence of other unstated features, elements, components and/or groups. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle splash guard. Accordingly, these terms, as utilized to describe the present invention should be interpreted relative to a vehicle equipped with the vehicle splash guard.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle splash guard comprising:
   a flexible body having a body panel attachment area that is configured to abut a vehicle body panel; and
   at least one reinforcement member that is in an interior of the flexible body so that the at least one reinforcement member is fixedly connected to the flexible body, the at least one reinforcement member having at least one bending portion that is a portion of weakness in the at least one reinforcement member to enable the at least one reinforcement member to deform at the bending portion in a direction towards the vehicle body panel to reduce a space between the splash guard and the vehicle body panel when the splash guard is installed onto the vehicle body panel.

2. The vehicle splash guard according to claim 1, wherein the at least one reinforcement member plastically deforms at the at least one bending portion to maintain the splash guard in a state that abuts the vehicle body panel.

3. The vehicle splash guard according to claim 1, wherein the at least one reinforcement member is a metal insert.

4. The vehicle splash guard according to claim 1, wherein the at least one reinforcement member is over-molded to the flexible body of the splash guard.

5. The vehicle splash guard according to claim 1, wherein the at least one reinforcement member includes a first support portion and a second support portion connected by the at least one bending portion.

6. The vehicle splash guard according to claim 5, wherein the at least one bending portion defines an area of reduced strength relative to the first and second support portions.

7. The vehicle splash guard according to claim 6, wherein the first and second support portions are angled with respect to each other by a predetermined angle.

8. The vehicle splash guard according to claim 5, wherein the flexible body includes a wheel-facing wall that faces a vehicle wheel well, the first support portion extends along the wheel-facing wall.

9. The vehicle splash guard according to claim 8, wherein the flexible body further includes an outer sidewall that extends from the wheel-facing wall in a direction towards the vehicle body panel, the second support portion being aligned with the outer sidewall.

10. The vehicle splash guard according to claim 9, wherein
   the at least one bending portion substantially aligns with an edge of the splash guard formed by the outer sidewall and the wheel-facing wall.

11. The vehicle splash guard according to claim 10, wherein
the at least one bending portion includes a first bending portion that aligns with the edge of the splash guard formed by the outer sidewall and the wheel-facing wall, and further includes a second bending portion that is formed on the second support portion.

12. The vehicle splash guard according to claim 5, wherein
the first support portion extends along the wheel-facing wall and the second support portion extends along the body panel attachment area.

13. The vehicle splash guard according to claim 12, wherein
the at least one bending portion extends along the body panel attachment area.

14. The vehicle splash guard according to claim 1, wherein
the flexible body includes an elongated area and a lateral area that extends at an angle with respect to the elongated area, the elongated area extending in a vehicle height direction and the lateral area extending in a vehicle width direction.

15. The vehicle splash guard according to claim 14, wherein
the at least one reinforcement member includes a first reinforcement member disposed in the elongated area.

16. The vehicle splash guard according to claim 15, wherein
the at least one reinforcement member further includes a second reinforcement member disposed in the elongated area and at location below the first reinforcement member.

17. The vehicle splash guard according to claim 16, wherein
the at least one reinforcement member further includes a third reinforcement member disposed in the lateral area.

18. The vehicle splash guard according to claim 1, wherein
the at least one bending portion defines a line of weakness in a corner of the at least one reinforcement member that aligns with a corner of the flexible body.

19. A vehicle splash guard comprising:
a flexible body having a body panel attachment area that is configured to abut a vehicle body panel; and
at least one reinforcement member that is a metal insert fixedly connected to the flexible body, the at least one reinforcement member having at least one bending portion that is a portion of weakness in the at least one reinforcement member to enable the at least one reinforcement member to deform at the bending portion in a direction towards the vehicle body panel to reduce a space between the splash guard and the vehicle body panel when the splash guard is installed onto the vehicle body panel,
the at least bending portion being an elongated relief cut formed in the metal insert.

20. A vehicle comprising:
a vehicle body panel having a quarter panel; and
a splash guard fixedly attached to the quarter panel, the splash guard having a flexible body and at least one reinforcement member embedded into the flexible body, the at least one reinforcement member having a bending portion that is a portion of weakness of the at least one reinforcement member to enable the flexible body to bend towards the quarter panel.

* * * * *